(12) United States Patent
Sawkar et al.

(10) Patent No.: US 12,373,542 B2
(45) Date of Patent: Jul. 29, 2025

(54) MULTI-DIMENSIONAL VOICE-BASED DIGITAL AUTHENTICATION

(71) Applicant: Bank of America Corporation, Charlotte, NC (US)

(72) Inventors: Rohit Sawkar, Charlotte, NC (US); Pratap Dande, St. Johns, FL (US); Morgan Allen, Waxhaw, NC (US); Kevin A. Delson, Woodland Hills, CA (US); Gilbert Gatchalian, Union, NJ (US); Swetha Ravi, Charlotte, NC (US); Lalit Dhawan, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 235 days.

(21) Appl. No.: 18/072,903

(22) Filed: Dec. 1, 2022

(65) Prior Publication Data
US 2024/0184876 A1 Jun. 6, 2024

(51) Int. Cl.
*G06F 21/45* (2013.01)
*G06F 21/32* (2013.01)

(52) U.S. Cl.
CPC .............. *G06F 21/45* (2013.01); *G06F 21/32* (2013.01)

(58) Field of Classification Search
CPC .................................. G06F 21/45; G06F 21/32
See application file for complete search history.

(56) References Cited

U.S. PATENT DOCUMENTS

| | | | |
|---|---|---|---|
| 8,869,305 B1* | 10/2014 | Huang | G06F 21/31 380/258 |
| 2002/0104025 A1* | 8/2002 | Wrench, Jr. | H04L 63/0861 709/227 |
| 2013/0036462 A1* | 2/2013 | Krishnamurthi | G06F 21/31 726/19 |
| 2013/0262873 A1* | 10/2013 | Read | H04L 63/0861 713/186 |
| 2019/0104471 A1* | 4/2019 | Nagey | H04W 12/12 |
| 2020/0312337 A1* | 10/2020 | Stafylakis | G06F 21/32 |
| 2022/0277070 A1* | 9/2022 | Robert Jose | H04L 63/0861 |
| 2022/0286451 A1* | 9/2022 | Tokuyama | H04L 63/0861 |

* cited by examiner

*Primary Examiner* — Patrice L Winder
(74) *Attorney, Agent, or Firm* — Weiss & Arons LLP

(57) ABSTRACT

Systems and methods for multi-dimensional voice-based digital authentication are provided. Methods include receiving, at a central server from a remote user device, a request to access a protected digital resource; displaying a prompt, at the device, requesting a spoken password expression; capturing, at the device, an expression spoken in response to the prompt; determining that the expression satisfies predetermined attributes of the password expression; calculating a voice pattern representation of the expression; determining that the voice pattern representation of the expression satisfies a threshold similarity to a voice pattern representation of the user that is stored in a database at the central server; and, in response to the expression satisfying the predetermined attributes of the password expression and satisfying the threshold similarity to the voice pattern representation of the user that is stored in the database at the central server, authorizing the device to access the protected digital resource.

18 Claims, 5 Drawing Sheets

MULTI-DIMENSIONAL VOICE-BASED DIGITAL AUTHENTICATION

FIELD OF TECHNOLOGY

Aspects of the disclosure relate to digital systems. Specifically, aspects of the disclosure relate to digital authentication systems.

BACKGROUND OF THE DISCLOSURE

It is common for a user on a remote computing device to attempt to access a protected resource. For example, the user may wish to log in to an online account. The online account may contain sensitive information. Accessing the protected resource may also include performing a sensitive action via a website. The sensitive action may implicate protected information or property. For example, the user may wish to execute an account transfer or an online purchase.

When the user attempts to access the protected resource, it is vital to authenticate the identity of the user. If the purported user is a bot or a hacker attempting to access the protected resource, physical and financial safety may be compromised. Conventional methods of authentication, such as passwords, may be relatively easy to discover or circumvent. Passwords may also be difficult for users to remember and may therefore prevent access to genuine users. Other known authentication methods, such as biometrics, may require additional equipment such as fingerprint or iris scanners. Such biometric authentications may also be intrusive and not user friendly.

It would be desirable, therefore, to provide systems and methods for digital authentication that increase the safety of sensitive digital resources while remaining non-intrusive and easy to use.

SUMMARY OF THE DISCLOSURE

Aspects of the disclosure relate to systems and methods for multi-dimensional voice-based digital authentication. Systems may include a central server in communication with a remote user device. Systems may include computer executable instructions that, when run on a processor, are configured to execute system functions.

Systems may be configured to receive, at the central server from the remote user device, a request to access a protected digital resource. Systems may be configured to display a prompt at the remote user device. The prompt may request a user of the remote user device to speak a password expression.

Systems may be configured to capture, at the remote user device, an expression spoken in response to the prompt. Systems may be configured to determine that the expression satisfies predetermined attributes of the password expression.

Systems may be configured to calculate a voice pattern representation of the expression. Systems may be configured to determine that the voice pattern representation of the expression satisfies a threshold similarity to a voice pattern representation of the user that is stored in a database at the central server.

In response to the expression satisfying the predetermined attributes of the password expression and satisfying the threshold similarity to the voice pattern representation of the user that is stored in the database at the central server, systems may be configured to authorize the remote user device to access the protected digital resource.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
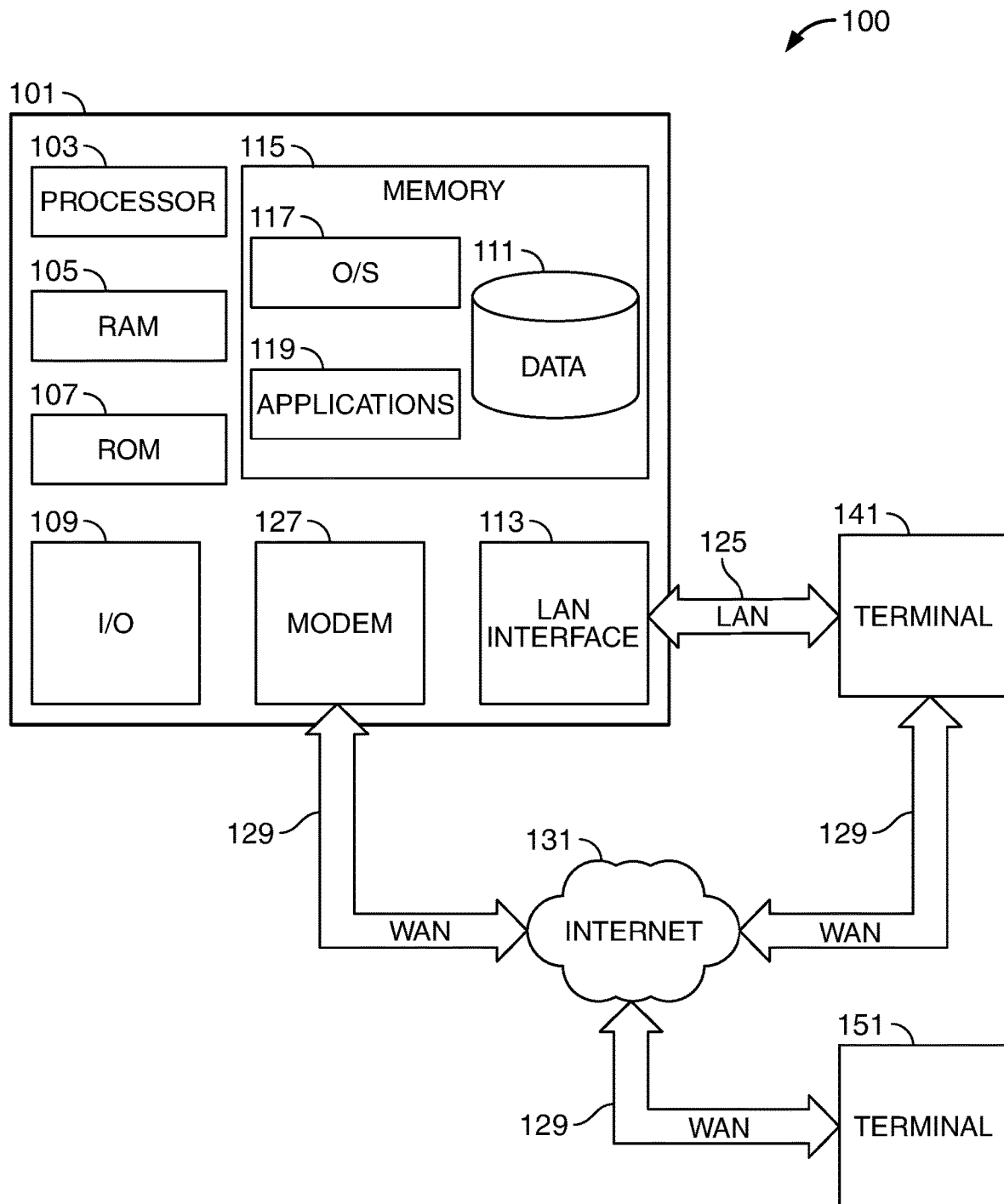
FIG. 1 shows an illustrative system in accordance with principles of the disclosure.

Aspects of the disclosure relate to systems and methods for multi-dimensional voice-based digital authentication. Systems may include a central server in communication with a remote user device. Systems may include computer executable instructions that, when run on a processor, are configured to execute system functions. Steps of the methods may be executed by computer code running on a processor and may correspond to system configurations.

Systems may be configured to receive, at the central server from the remote user device, a request to access a protected digital resource. The protected digital resource may, for example, include a secure website or account. The protected digital resource may include a mechanism usable to conduct a transaction or a transfer. The protected digital resource may include any suitable digital resource that is protected to prevent unauthorized access.

Systems may be configured to display a prompt at the remote user device. The remote user device may be a computing device that includes a processor, a memory, a display screen, and/or a microphone. The remote user device may, for example, be a computing device such as a laptop, desktop, tablet, mobile phone, smartwatch, or any other suitable user device. The prompt may be a visual prompt displayed on a screen of the device. In some embodiments, the prompt may be an audible prompt played on a speaker of the device. The prompt may request a user of the remote user device to speak a password expression.

Systems may be configured to capture, at the remote user device, an expression spoken in response to the prompt. The expression may be captured by a microphone embedded in, or otherwise in communication with, the device. Systems may be configured to determine that the expression satisfies predetermined attributes of the password expression.

In certain embodiments, satisfying the predetermined attributes of the password expression may include matching a word sequence preselected by the user. The word sequence may, for example, be a word or phrase preselected to satisfy the password expression.

In some embodiments, the word sequence may be a target word sequence that is one of a plurality of word sequences preselected by the user. A word sequence may be selected as the target word sequence depending on a predetermined factor. For example, the user may have preselected two, three, four, or more password expressions, and each one may be preselected as the correct password depending on the predetermined factor. The predetermined factor may, for example, be location, time, or any other suitable factor.

In certain embodiments, the predetermined factor may be geographic location. The system may be further configured to determine, via a global positioning system (GPS) sensor of the remote user device, a geographic location of the remote user device, and transmit the geographic location of the remote user device to the central server. For example, the user may have selected "Password One" as the first expression and "Password Two" as the second expression. The user may select the first expression to be the correct password in a first location (e.g., at the user's home, at a bank branch, in a certain city, state, or country, etc.), and the second expression to be the correct password at a second location (e.g., outside of the first location, in a certain other city, state, or country, etc.).

In some embodiments, the predetermined factor may be time-based. For example, the user may have selected a different password for each day of the week, month, or year. The user may have one password for weekdays and one for weekends. The user may, in certain embodiments, be able to customize the parameters of the predetermined factors and select passwords corresponding to the custom parameters.

In certain embodiments, satisfying the predetermined attributes of the password expression may include responding accurately to a question that is part of the prompt.

In some embodiments, the question may be a predetermined security question with a preset accurate response. The security questions may, for example, include personal questions such as "what was the make and model of your first car."

In certain embodiments, the question may be based on activity of the user. The protected digital resource may be associated with a digital application running on the remote user device. The activity may be logged by the digital application and may be stored in the database at the central server. The activity may include travel activity (e.g., "which city were you in last Sunday?"). The activity may include transactional activity (e.g., "how much did you spend at Macy's online last Sunday?"). The activity may include both travel and transactional activity ("in which store branch did you recently purchase a sofa?").

In some embodiments, the correct password may depend on user activity in combination with a predetermined factor. For example, the system may be configured to ask a different activity-based question based on a factor such as time or location.

In addition to determining whether the expression satisfies the predetermined attributes, systems may be configured to calculate a voice pattern representation of the expression. Calculating the voice pattern representation may include passing the expression to a speech recognition engine, which may, in certain embodiments, include a ML model trained to recognize the identity of the speaker of a spoken expression. The voice pattern representation may be a multi-dimensional value representing how the expression is spoken. For example, the dimensions may include one or more of tone, volume, tenor, pitch, speed, cadence, clarity, pronunciation, accent, accuracy, vocabulary level, and/or any other metric that may indicate an identity of the person speaking the expression. The voice pattern representation may include a multi-dimensional value for which the value at each dimension represents a score along one of the metrics.

Systems may be configured to determine that the voice pattern representation of the expression satisfies a threshold similarity to a voice pattern representation of the user that is stored in a database at the central server. The user may, for example, have pre-recorded a test expression for the purpose of generating a voice pattern representation to store at the central server. In some embodiments, the voice pattern representation at the central server may have been calculated based on expressions of the user recorded in previous conversations with the entity associated with the central server. This feature, as well as some or all other system features, may be subject to consent (e.g., an opt-in or a consent in response to a request from the entity) from the user.

In response to the expression satisfying the predetermined attributes of the password expression and satisfying the threshold similarity to the voice pattern representation of the user that is stored in the database at the central server, systems may be configured to authorize the remote user device to access the protected digital resource.

In some embodiments, the expression satisfying the predetermined attributes of the password expression and satisfying the threshold similarity to the voice pattern representation of the user that is stored in the database at the central server may be a part of a multi-factor authentication. The multi-factor authentication may also include one or more of a list that includes biometric verification (e.g., fingerprint, facial recognition, retina scan, etc.), a preset password, and a one-time password (OTP). The voice-based authentication may thus be part of a broader authentication regime, maximizing the security and protection of the digital resource.

In some embodiments, other authentication methods may be used by default, and the voice-based authentication of the disclosure may be triggered in certain circumstances. The circumstances may include an attempt to execute a transfer or transaction that involves more than a threshold amount of money. The circumstances may include the system detecting indicia associated with a high level of risk of fraud or error in the system.

In certain embodiments, the system may include a safety mechanism. The safety mechanism may include a voice-based trigger that triggers a safety response. The trigger may be a predetermined safety word or phrase. The trigger may be a level of danger or stress detected in the voice pattern representation. When triggered, the safety response may include an alert sent to a designated phone number or email address. The safety response may include an alert sent to authorities. the safety response may include an alert sent to an entity associated with the central server. The safety response may include a freezing of an account associated with the user device and/or the protected digital resource.

A voice-based authentication system is thus provided. The authentication system may use multiple points of authentication based on one spoken expression. The multiple points of authentication may include the content of the expression being correct as well as the way the expression is spoken. Leveraging one spoken expression for multiple points of authentication may provide a high level of accuracy of the system while maintaining a low level of effort for the user. Moreover, utilizing a spoken expression may provide advantages over conventional (e.g., typed) passwords, and even over other forms of biometric authentication. For example, conventional passwords may be submitted against the will of the true user. Even some biometrics, such as a fingerprint, may be a passive method that may be submitted when the true user is unaware (e.g., asleep or unconscious). Using a spoken expression, however, may ensure that the user is aware and is willingly submitting an active form of identification. Furthermore, submitting a spoken expression may be easier for the user, and may open the system to users with a broader range of cognitive and physical abilities as well as levels of familiarity with technology.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to digital authentication. The input/output module may also include one or more speakers for providing audio output and a video display device for providing textual, audio, audiovisual, and/or graphical output. The input and output may be related to computer application functionality. The input and output may be related to digital authentication.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to digital authentication.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
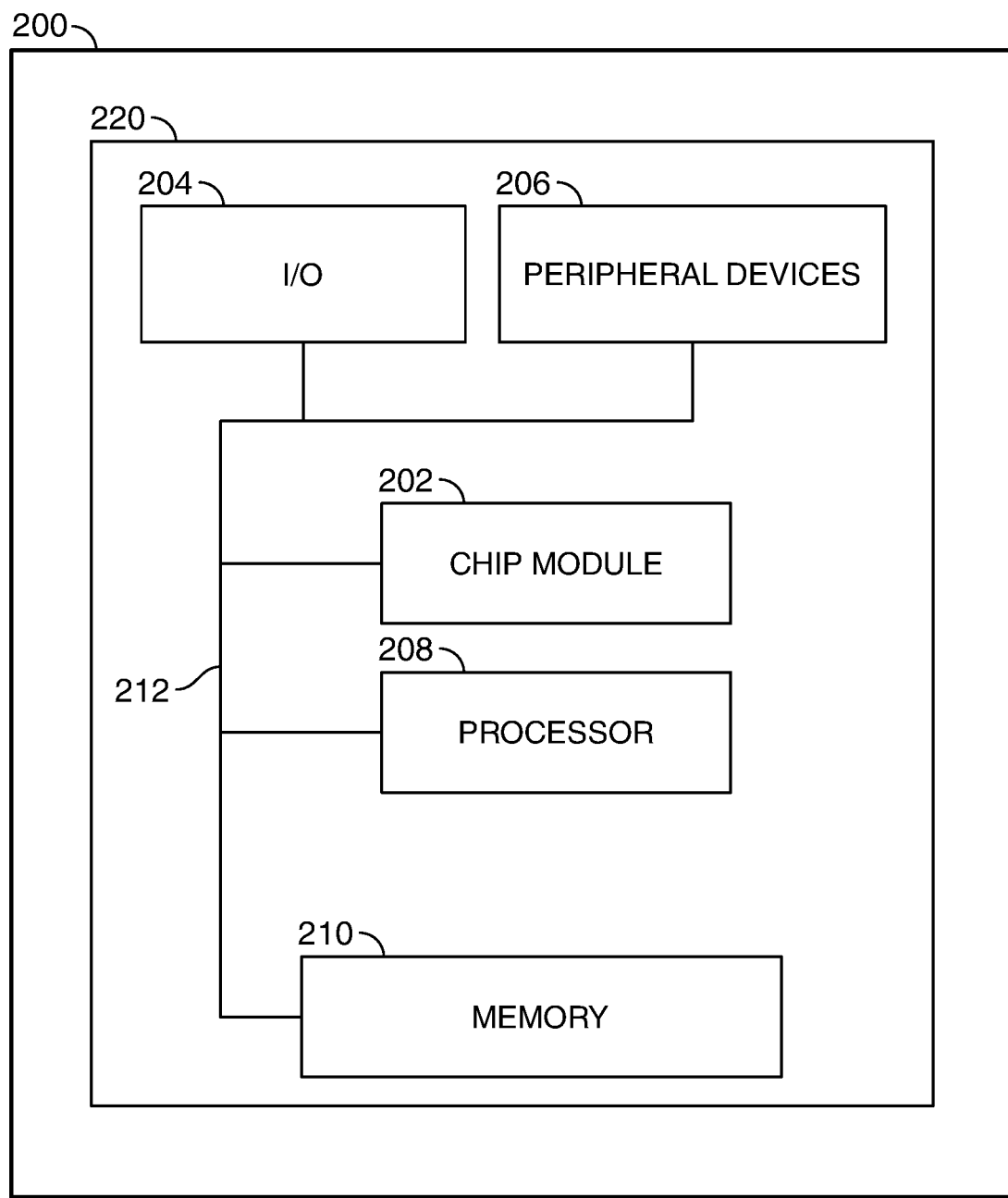
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
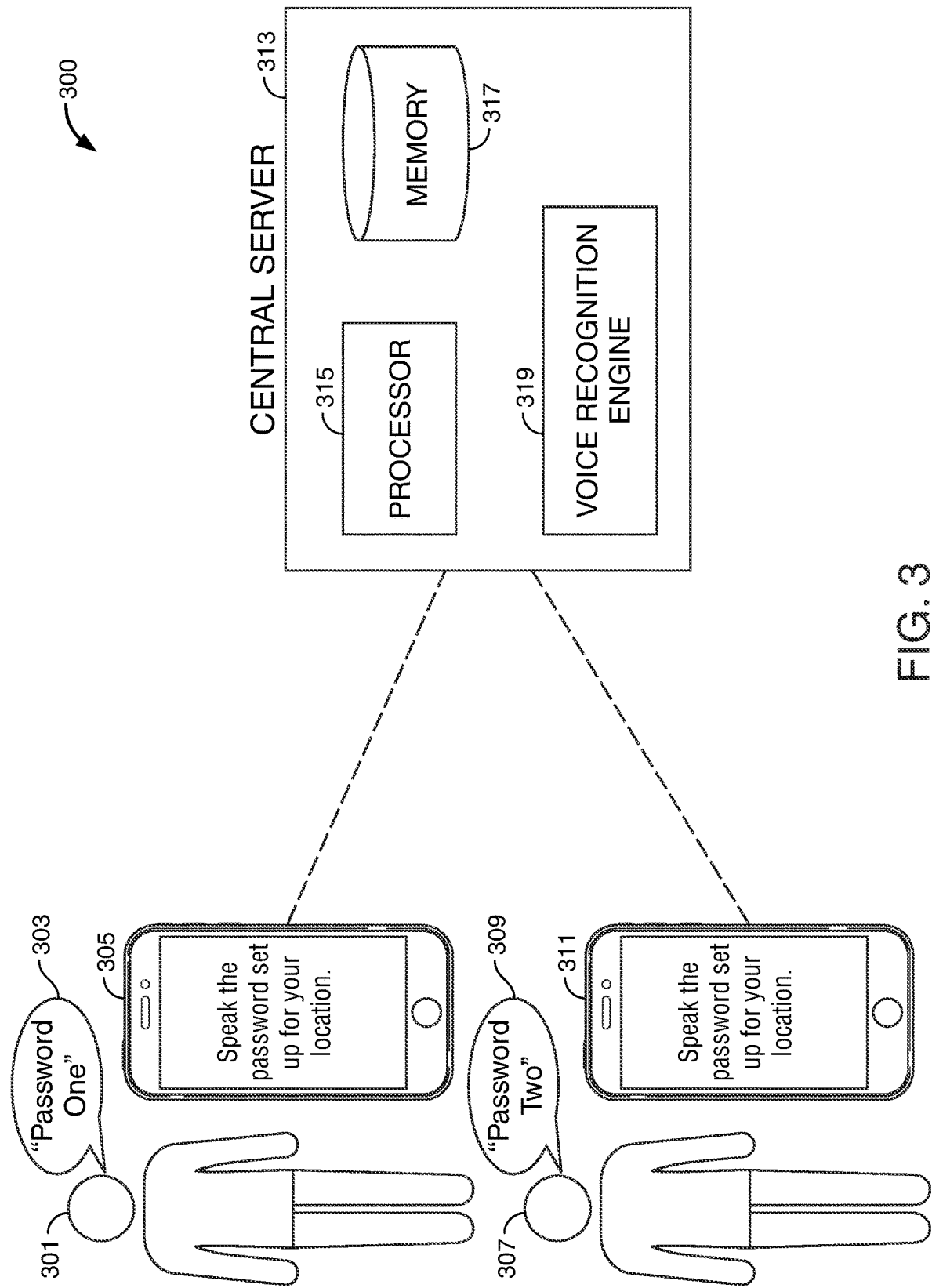
FIG. 3 shows an illustrative diagram in accordance with principles of the disclosure.

FIG. 3 shows illustrative diagram 300 in accordance with principles of the disclosure. Diagram 300 shows one embodiment of a voice-based authentication system. Diagram 300 includes central server 313 which includes processor 315, memory 317, and voice recognition engine 319.

Diagram 300 shows user device 305 displaying a prompt. The illustrative prompt in this example reads "Speak the password set up for your location." User 301 is shown in a first location speaking first password expression 303. User device 305 may capture the first spoken expression and transmit it to central server 313. Central server 313 may determine whether the first spoken expression satisfies predetermined attributes of the password (e.g., did the user speak the correct password based on the user's location). Central server 313 may also determine, via voice recognition engine 319, whether the first spoken expression satisfies a voice pattern representation associated with the user.

Diagram 300 shows user device 311 displaying a prompt. The illustrative prompt in this example reads "Speak the password set up for your location." User 307 is shown in a second location speaking second password expression 309. User device 311 may capture the second spoken expression and transmit it to central server 313. Central server 313 may determine whether the second spoken expression satisfies predetermined attributes of the password (e.g., did the user speak the correct password based on the user's location). Central server 313 may also determine, via voice recognition engine 319, whether the second spoken expression satisfies a voice pattern representation associated with the user. User 301 and device 305 may be the same user and device as user 307 and device 311, just in a different location. In both locations, the system may only authenticate the user when the content of the spoken expression satisfies the predetermined attributes of the password, and the voice pattern representation matches that of the user.

Figure 4:
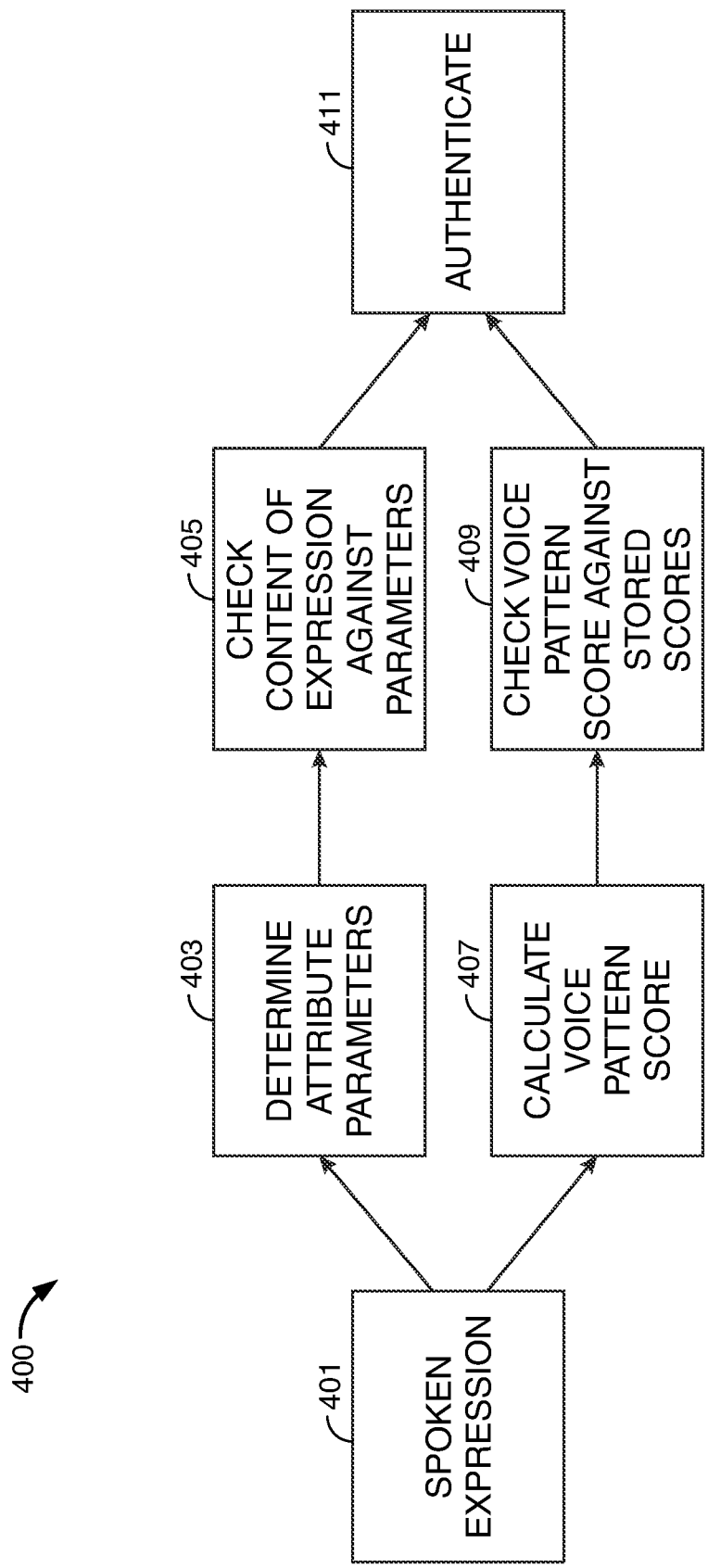
FIG. 4 shows another illustrative diagram in accordance with principles of the disclosure.

FIG. 4 shows illustrative diagram 400 in accordance with principles of the disclosure. Diagram 400 shows an aspect of the disclosed multi-dimensional voice-based authentication system. Diagram 400 shows spoken expression 401. One dimension of the authentication proceeds with determining relevant attribute parameters 403, and checking if the content of spoken expression 401 satisfies the attributes at 405. A second track proceeds with calculating a voice pattern representation score 407 of spoken expression 401, and checking the score against a stored score associated with the user. When both tracks are satisfied, the system may authenticate the user at 411. It should be noted that the illustrative authentication shown in diagram 400 may be a part of a broader authentication scheme, as discussed elsewhere in this disclosure.

Figure 5:
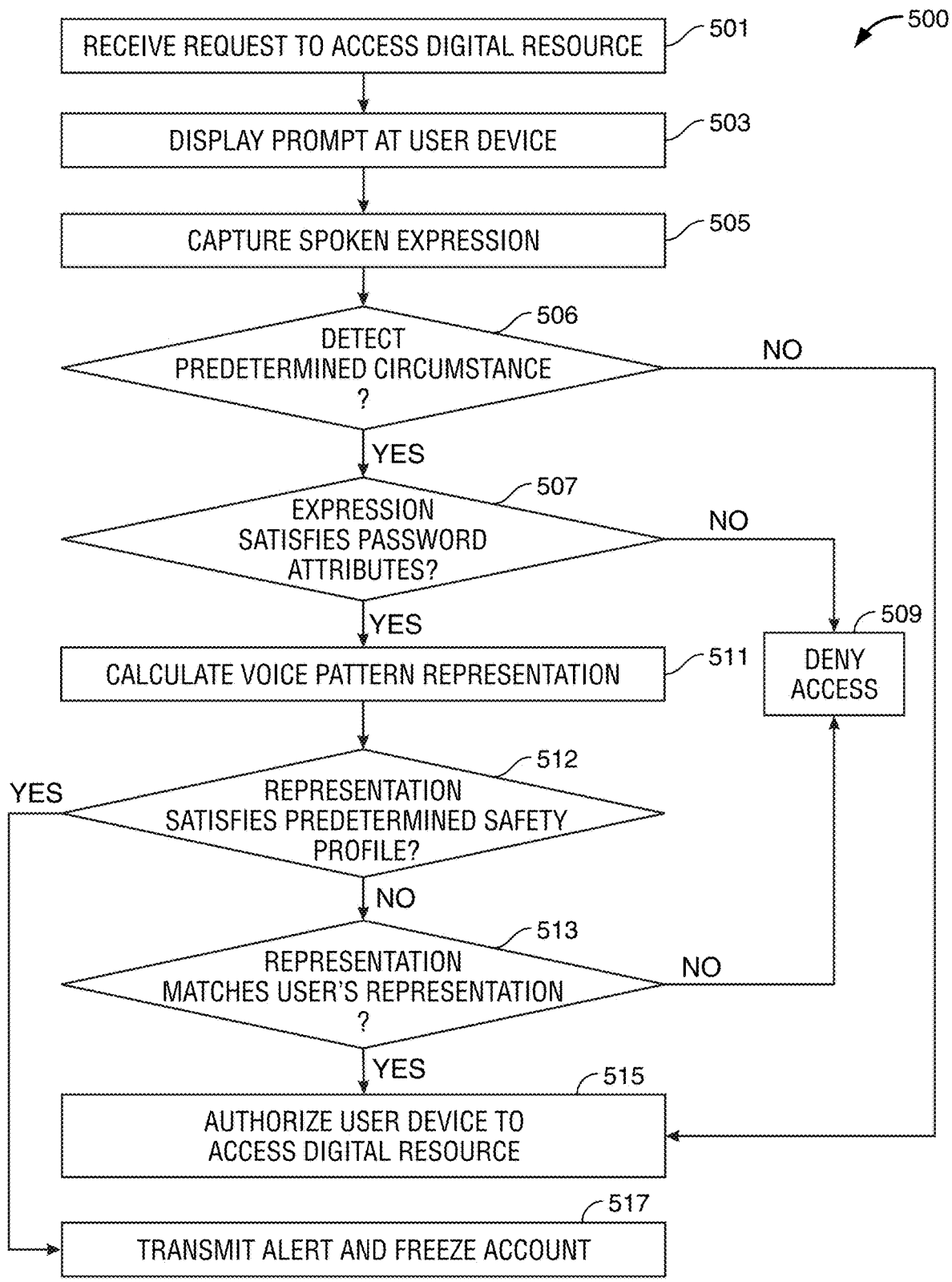
FIG. 5 shows an illustrative flowchart in accordance with principles of the disclosure.

FIG. 5 shows illustrative flowchart 500 in accordance with principles of the disclosure. Flowchart 500 begins with step 501, receiving a request to access a digital resource. Step 503 includes displaying a prompt at a user device. Step 505 includes capturing a spoken expression. At step 506 the system may determine whether a predetermined circumstance (e.g., an attempted transaction exceeding a threshold amount) is detected. If a predetermined circumstance is not detected, the system may follow a default state and proceed to allow access at step 515. If a predetermined circumstance is detected, the system may require additional authentication and proceed to step 507. At step 507 the system determines whether the expression satisfies predetermined password attributes. If the expression does not satisfy the attributes, access is denied at step 509. If the expression does satisfy the attributes at 507, step 511 includes calculating a voice pattern representation of the expression. At step 512 the system may determine whether the voice pattern representation satisfies a predetermined safety profile (e.g., a safety phrase or stress level). If the voice pattern representation satisfies the predetermined safety profile, the system may transmit an alert and freeze an account (step 517). If the voice pattern representation does not satisfy the predetermined safety profile, the system may proceed to step 513. At step 513 the system compares the voice pattern representation to a representation stored for the user. If the representations do not match, access is denied at step 509. If the representations do match at step 513, step 515 includes authorizing the user device to access the digital resource.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for multi-dimensional voice-based digital authentication are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for multi-dimensional voice-based digital authentication, the method comprising:
   receiving, at a central server from a remote user device, a request to access a protected digital resource;
   displaying a prompt on a display of the remote user device, said prompt requesting a user of the remote user device to speak a password expression;
   capturing, via a microphone of the remote user device, an expression spoken in response to the prompt;
   determining that content of the expression satisfies predetermined attributes of the password expression, said satisfying comprising matching a target word sequence, wherein:
      the target word sequence is one of a plurality of word sequences preselected by the user, and the target word sequence is determined in real-time from the plurality of word sequences by:
         determining, via a global positioning system (GPS) sensor of the remote user device, a geographic location of the remote user device;
         transmitting the geographic location of the remote user device to the central server; and
         selecting the target word sequence based on a preset mapping between geographic locations and the plurality of word sequences;
   calculating a voice pattern representation of the expression;
   determining that the voice pattern representation of the expression satisfies a threshold similarity to a voice pattern representation of the user that is stored in a database at the central server; and
   in response to the content of the expression satisfying the predetermined attributes of the password expression and the voice pattern representation of the expression satisfying the threshold similarity to the voice pattern representation of the user that is stored in the database at the central server, authorizing the remote user device to access the protected digital resource.

2. The method of claim 1 wherein the predetermined factor is time-based.

3. The method of claim 1 wherein satisfying the predetermined attributes of the password expression comprises responding accurately to a question that is part of the prompt.

4. The method of claim 3 wherein the question is a predetermined security question with a preset accurate response.

5. The method of claim 3 wherein:
   the protected digital resource is associated with a digital application running on the remote user device; and
   the question is based on activity of the user that is logged by the digital application and stored in the database at the central server.

6. The method of claim 5 wherein the activity comprises travel activity.

7. The method of claim 5 wherein the activity comprises transactional activity.

8. The method of claim 1 wherein the content of the expression satisfying the predetermined attributes of the password expression and the voice pattern representation of the expression satisfying the threshold similarity to the voice pattern representation of the user that is stored in the database at the central server is a part of a multi-factor authentication, and the multi-factor authentication also comprises one or more of a list comprising:
   biometric verification;
   a preset password; and
   a one-time password.

9. The method of claim 1 wherein:
   in a default state, the protected digital resource is accessible without the multi-dimensional voice-based digital authentication achieved when the content of the expression satisfies the predetermined attributes of the password expression and the voice pattern representation of the expression satisfies the threshold similarity to the voice pattern representation of the user that is stored in the database at the central server; and
   in response to detection of a predetermined circumstance, the protected digital resource becomes inaccessible until the multi-dimensional voice-based digital authentication is achieved.

10. The method of claim 1 wherein, when the voice pattern representation of the expression satisfies a predetermined safety profile, the method further comprises transmitting an alert to a predetermined recipient and freezing an account associated with the remote user device.

11. A system for multi-dimensional voice-based digital authentication, the system comprising a central server in communication with a remote user device, wherein:
   the remote user device is a computing device comprising a first processor, a first memory, a display screen, and a microphone;
   the central server comprises a second processor, a second memory, and computer executable instructions stored in the second memory; and
   the system is configured to:
      receive, at the central server from the remote user device, a request to access a protected digital resource;
      display a prompt on the display screen of the remote user device, said prompt requesting a user of the remote user device to speak a password expression;
      capture, via the microphone of the remote user device, an expression spoken in response to the prompt;
      determine that content of the expression satisfies predetermined attributes of the password expression, said satisfying comprising achieving an accurate response to a question that is part of the prompt, wherein:
         the protected digital resource is associated with a digital application running on the remote user device;
         the question is based on activity of the user that is logged by the digital application and stored in the database at the central server; and the activity comprises travel activity and transactional activity;

calculate a voice pattern representation of the expression;

determine that the voice pattern representation of the expression satisfies a threshold similarity to a voice pattern representation of the user that is stored in a database at the central server; and in response to the content of the expression satisfying the predetermined attributes of the password expression and the voice pattern representation of the expression satisfying the threshold similarity to the voice pattern representation of the user that is stored in the database at the central server, authorize the remote user device to access the protected digital resource.

12. The system of claim 11 wherein satisfying the predetermined attributes of the password expression comprises matching a word sequence preselected by the user.

13. The system of claim 12 wherein the word sequence is a target word sequence that is one of a plurality of word sequences preselected by the user, and a word sequence is selected as the target word sequence depending on a predetermined factor.

14. The system of claim 13 wherein the predetermined factor is geographic location, and the system is further configured to:

determine, via a global positioning system (GPS) sensor of the remote user device, a geographic location of the remote user device; and transmit the geographic location of the remote user device to the central server.

15. The system of claim 12 wherein the predetermined factor is time-based.

16. The system of claim 11 wherein the content of the expression satisfying the predetermined attributes of the password expression and the voice pattern representation of the expression satisfying the threshold similarity to the voice pattern representation of the user that is stored in the database at the central server is a part of a multi-factor authentication, and the multi-factor authentication also comprises one or more of a list comprising:

biometric verification;

a preset password; and a one-time password.

17. The system of claim 11 wherein:

in a default state, the protected digital resource is accessible without the multi-dimensional voice-based digital authentication achieved when the content of the expression satisfies the predetermined attributes of the password expression and the voice pattern representation of the expression satisfies the threshold similarity to the voice pattern representation of the user that is stored in the database at the central server; and in response to detection of a predetermined circumstance, the protected digital resource becomes inaccessible until the multi-dimensional voice-based digital authentication is achieved.

18. The system of claim 11 wherein, when the voice pattern representation of the expression satisfies a predetermined safety profile, the system is further configured to transmit an alert to a predetermined recipient and to freeze an account associated with the remote user device.

* * * * *